United States Patent [19]

Spors et al.

[11] Patent Number: 5,074,601
[45] Date of Patent: Dec. 24, 1991

[54] QUICK-RELEASE CONNECTOR FOR FLEXIBLE HOSES AND THE LIKE

[75] Inventors: Ralf Spors, Bruchköbel; Gerhard Wachter, Büdingen; Ralf Hohmann, Bruchköbel; Frank Bahner, Neu Isenburg, all of Fed. Rep. of Germany

[73] Assignee: Rasmussen GmbH, Maintal, Fed. Rep. of Germany

[21] Appl. No.: 591,562

[22] Filed: Oct. 2, 1990

[30] Foreign Application Priority Data

Oct. 7, 1989 [DE] Fed. Rep. of Germany ....... 3933591

[51] Int. Cl.$^5$ .................................... F16L 37/00
[52] U.S. Cl. .................................... 285/308; 285/921; 285/423
[58] Field of Search .................. 285/39, 308, 319, 921, 285/314, 305, 423

[56] References Cited

U.S. PATENT DOCUMENTS

| | | | |
|---|---|---|---|
| 3,428,340 | 2/1969 | Pelton | 285/308 X |
| 4,541,657 | 9/1985 | Smyth | 285/308 X |
| 4,591,192 | 5/1986 | Van Exel et al. | 285/308 X |
| 4,844,512 | 7/1989 | Gahwiler | 285/39 |
| 4,991,882 | 2/1991 | Gahwiler | 285/39 |

FOREIGN PATENT DOCUMENTS 3727858 1/1989 Fed. Rep. of Germany .
8815247 6/1989 Fed. Rep. of Germany .

Primary Examiner—Dave W. Arola
Attorney, Agent, or Firm—Peter K. Kontler

[57] ABSTRACT

A quick-release connector wherein a tubular male component has a rear portion insertable into the end portion of a first conduit and a front portion insertable into the resilient front part of a tubular female component. The male component has an annular protuberance between the front and rear portions and the protuberance has a conical front flank and a radial rear flank. The rear part of the female component is insertable into the end portion of a second conduit and the front part has two arms with internal male detents within a ring which connects the front ends of the arms to each other. In order to insert the front portion of the male component, the conical flank of the protuberance is caused to move the detents apart until the detents snap behind the radial flank of the protuberance. An annular disengaging member has two parallel walls which are inwardly adjacent the arms behind the detents and have ramps which can be moved against the arms to thus move the detents apart and permit extraction of the protuberance and front portion of the male component from the female component. The disengaging member is more or less permanently connected with the female component and is movable transversely of the female component between a first end position in which the ramps deform the arms and a second end position in which the detents are free to engage the radial flank of the protuberance.

10 Claims, 1 Drawing Sheet

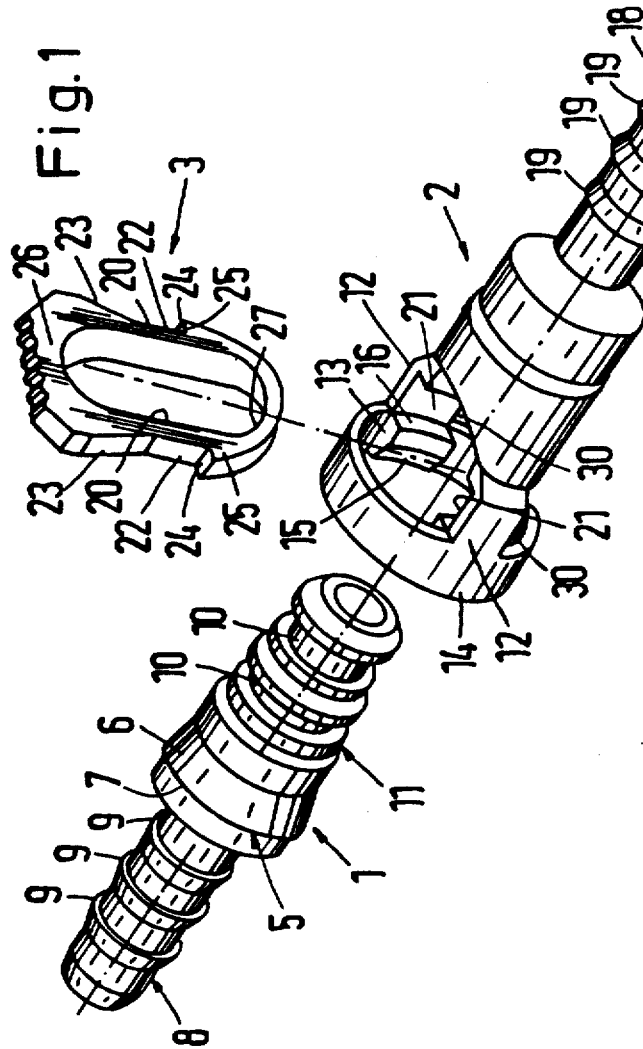
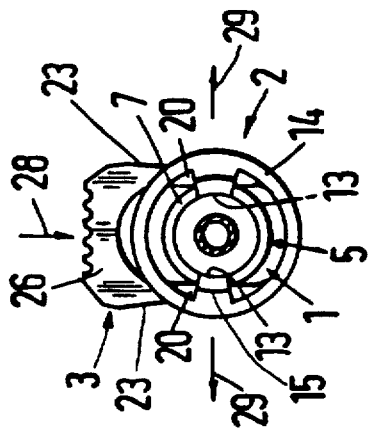
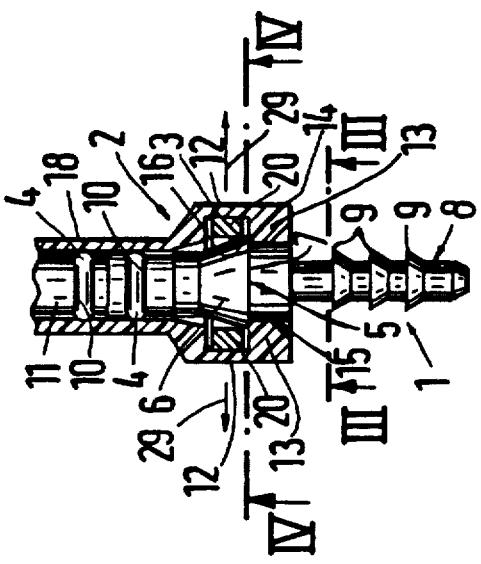
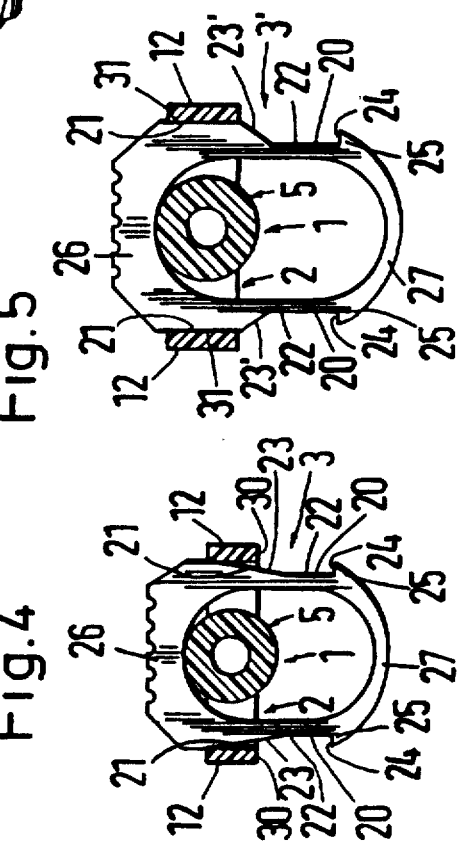

QUICK-RELEASE CONNECTOR FOR FLEXIBLE HOSES AND THE LIKE

BACKGROUND OF THE INVENTION

The invention relates to improvements in flexible hoses.

Published German patent application No. 37 27 858 of Gähwiler discloses a quick-release connector with a male component which has a rear which can carry one or more external sealing rings and an annular protuberance between the front and rear portion. The protuberance has a conical front flank which slopes toward the axis of the male component in a direction toward the front portion, and a radial rear flank or shoulder which confronts the rear portion of the male component. The front portion of the male component and the sealing ring or rings thereon can be inserted into the elastically deformable front part of a female component the rear part of which is insertable into the end portion of a second flexible hose. The front part of the female component has a ring with an inner protuberance and two axially parallel deformable arms which extend from the ring toward the rear part. The internal surface of the ring is provided with two male detents in the form of teeth which can engage the radial shoulder of the protuberance subsequent to introduction of the protuberance into the front part of the female component. In order to separate the teeth from the protuberance, the ring of the front part of the female component must be deformed to assume an oval shape, or the operator employs a tuning fork like implement to move the teeth apart preparatory to extraction of the protuberance from the female component. A drawback of the just described connector is that the implement is likely to be displaced or lost so that the person in charge is unable to detach the male component from the female component. Moreover, an operator is not likely to immediately locate those portions of the ring which must be pressed toward each other in order to impart to the ring an oval shape with attendant disengagement of the teeth from the radial shoulder of the protuberance on the male component. In addition, and in order to avoid accidental separation of the male and female components, it is necessary to design the female component in such a way that the person in charge of disengaging the two components must apply a pronounced force to adequately deform the ring, i.e., to deform the ring to an extent which is necessary to permit extraction of the protuberance from the front part of the female component. Additional problems arise if the person in charge of separating the male and female components happens to change the orientation of one of the components, namely if the male component is not centered in the female component. The absence of accurate centering during intended separation of the male and female components is likely to result in mere partial disengagement of one of the teeth from the protuberance so that the person in charge is unable to extract the male component from the female component. Still further, an inexperienced person is likely to subject the ring to excessive deforming stresses, particularly while the male component is being extracted from the female component, so that the ring is apt to undergo permanent deformation or to break. The arms are equally likely to undergo permanent deformation or to be destroyed in response to excessive deformation of the ring.

German Utility Model No. 88 15 247.2 of Ems-Inventa AG discloses a modified quick-release connector which is similar to the connector of Gähwiler except that the female component defines an annular pocket for the front portion of the male component. The sealing element or elements are installed between the internal surface of the front portion of the male component and the adjacent external surface of a tubular inner portion of the female component.

OBJECTS OF THE INVENTION

An object of the invention is to provide a quick-release coupling or connector wherein the male and female components can be disengaged from each other in a simple and time-saving manner.

Another object of the invention is to provide a connector which need not be furnished with a separate or separable implement to facilitate disengagement of the male and female components from each other.

A further object of the invention is to provide a novel and improved female component for use in the above outlined connector.

An additional object of the invention is to provide the connector with novel and improved means for facilitating disengagement of the male and female components from each other.

Another object of the invention is to provide a simple and inexpensive connector which can establish a sealed path for the flow of a gaseous or hydraulic fluid between two rigid or flexible conduits, e.g., between two flexible hoses, between a hose and a nipple, between a hose and a pipe or between two pipes.

Still another object of the invention is to provide a novel and improved method of manipulating the above outlined quick release connector.

A further object of the invention is to provide a novel and improved combination of two conduits which are separably coupled to each other by the above outlined quick release connector.

A further object of the invention is to provide a connector wherein the male and female components are properly centered relative to each other during extraction of the male component from the female component.

Another object of the invention is to provide a connector wherein the deformable parts are less likely to undergo excessive deformation than the deformable parts of heretofore known quick-release connectors.

An additional object of the invention is to provide a simple and inexpensive connector which can be utilized in lieu of conventional connectors to establish reliable connections between flexible and/or rigid conduits for liquids, gases and/or other flowable media.

SUMMARY OF THE INVENTION

The invention is embodied in a quick-release connector which can separably couple a pair of hoses or other conduits The improved connector comprises an elongated tubular male component having a rear portion which is connectable to (particularly insertable into) one of the conduits to be separably coupled to each other, a front portion and a preferably circumferentially complete protuberance between the front and rear portions. The protuberance has a conical front flank which slopes inwardly (i.e., toward the axis of the male component) toward the front portion and a substantially radial flank or shoulder which confronts the rear portion of the male component. The connector further comprises an elongated tubular female component having a rear part which is connectable with (e.g., insertable into) the other conduit and a resilient front part which serves to receive the front portion of the male component. The front part of the female component comprises a ring and a pair of arms which are disposed substantially diametrically opposite each other and extend substantially longitudinally of the female component. Each arm includes an internal male detent having a conical cam face which slopes outwardly away from the rear part and is displaceable by the conical flank during insertion of the front portion of the male component into the front part. Each detent further comprises a substantially radially extending shoulder which confronts the rear part of the female component and abuts the radial flank of the protuberance upon completed insertion of the front portion of the male component. The improved connector further comprises means for disengaging the detents from the protuberance in order to permit extraction of the front portion of the male component from the front part of the female component. The disengaging means preferably resembles or constitutes an annular member having two spaced apart walls each of which is inwardly adjacent one of the arms and each of which is movable transversely (radially) of the front part between first and second positions. The walls have external ramps which spread the arms apart in response to movement of the walls toward the first positions to thereby disengage the detents from the protuberance, and the ramps permit the arms to move their detents toward each other due to resiliency of the front part in the second positions of the walls.

At least one of the walls can be provided with an external stop which abuts the respective arm in the second positions of the walls to thus prevent the walls from moving beyond the second positions (i.e., further away from their first positions).

The annular member which forms part of or constitutes the disengaging means preferably further comprises two webs which alternate with the walls and one of which abuts the protuberance in the first positions of the walls to prevent the walls from moving beyond the first positions (i.e., further away from the second positions).

The inner diameter of the ring is greater than the outer diameter of the protuberance, and the distance of the detents from each other in undeformed condition of the front part (e.g., when the front portion of the male component is extracted from the front part of the female component) is less than the outer diameter of the protuberance.

The connector further comprises at least one elastically deformable annular sealing element which surrounds the front portion of the male component and is surrounded by the front part of the female component when the front portion is inserted into the female component. Each sealing element can constitute an O-ring which extends in part into an external groove of front portion of the male component.

The internal surfaces of the arms can be provided with transversely extending recesses for the respective walls of the annular member.

In accordance with one presently preferred embodiment, the arms abut the respective ramps in the first positions of the walls, and the slope of the ramps is preferably selected in such a way that the arms automatically maintain the walls in the second positions due to resiliency of the front part of the female component unless the walls are forcibly held in the first positions. In other words, the ramps tend to slide beyond the internal surfaces of the respective arms to thus ensure that the detents are sufficiently close to each other to engage the radial flank of the protuberance in inserted position of the front portion of the male component until and unless the walls of the annular member are forcibly moved to their first positions.

In accordance with another presently preferred embodiment, the walls further comprise platforms which are adjacent the respective ramps and engage the respective arms in the first positions of the walls to prevent the arms from moving the walls toward the second positions due to resiliency of the front part of the female component (i.e., it is then necessary to forcibly move the walls from the first positions so that the platforms are disengaged from the respective arms and the arms are free to act upon the respective ramps in order to move the walls toward their second positions. The platforms can be provided with parallel outer surfaces which engage the respective arms in the first positions of the walls.

The novel features which are considered as characteristic of the invention are set forth in particular in the appended claims. The improved connector itself, however, both as to its construction and the mode of using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is an exploded perspective view of a quick-release connector which embodies one form of the invention, the sealing elements between the male and female components being omitted;

FIG. 2 is a smaller-scale view of the assembled connector, a portion of the female component being broken away and this component being shown in an axial sectional view;

FIG. 3 is a transverse sectional view as seen in the direction of arrows from the line III—III of FIG. 2, the disengaging means being shown in the inoperative position;

FIG. 4 is an enlarged transverse sectional view substantially as seen in the direction of arrows from the line IV—IV of FIG. 2, with the disengaging means shown in the operative position; and FIG. 5 is a sectional view similar to that of FIG. 4 but showing modified disengaging means capable of remaining in the operative position in spite of resiliency of the front part of the female component.

DESCRIPTION OF PREFERRED
EMBODIMENTS

The quick-release connector which is shown in FIGS. 1 to 4 comprises an elongated male tubular component 1, an elongated female tubular component 2, two ring-shaped sealing elements 4 (shown only in FIG. 2) of elastomeric material, and an annular disengaging member 3. The male component 1 has a front portion 11 with several external circumferentially complete grooves 10 for portions of the sealing elements 4, a rear portion 8 which has several circumferentially complete external ribs 9, and an intermediate portion 5 in the form of an annular protuberance having a conical first or front flank 6 which slopes toward the axis of the male component 1 in a direction toward the front portion 11, and a substantially radially extending rear flank or shoulder 7 which confronts the rear portion 8. The latter can be inserted into a first conduit (not shown), e.g., into one end portion of a flexible hose, and such end portion can be surrounded by a standard clamp (not shown) to prevent unintentional extraction of the rear portion 8 from the respective conduit. The clamp forces some material of the conduit into the annular spaces between the ribs 9 to thus reduce the likelihood of accidental separation of the male component 1 from the respective conduit.

The female component 2 includes a rear part 18 which has a set of circumferentially complete external ribs 19 and can be inserted into one end portion of a second conduit (not shown), e.g., into a flexible hose which is to convey a stream of fluid into or to receive a stream of fluid from the conduit receiving the end portion 8 of the male component 1. The conduit is secured to the rear part 18 by a standard clamp, not shown. The female component 2 further comprises a resilient front part including a ring 14 having an inner diameter larger than the maximum diameter of the protuberance 5, and two elongated arms 12 which extend in the longitudinal direction of the component 2 from the ring 14 toward the rear part 18. The arms 12 are disposed substantially or exactly diametrically opposite each other and have internal surfaces provided with confronting male detents 13 within the ring 14. Each detent 13 has a conical cam face 15 which diverges away from the axis of the female component 2 toward the front face of the ring 14, and a substantially radially disposed shoulder 16 which faces toward the rear part 18 and is engaged by the radial flank 7 of the protuberance 5 when the front portion 11 of the male component 1 is properly inserted into the front part 12-14 of the female component 2. The elastomeric sealing elements 4 (e.g., in the form of standard 0-rings) are then received in the respective grooves 10 of the front portion 11 and sealingly engage the external surface of the male component 1 as well as the internal surface of the female component 2 in the region between the arms 12 and the rear part 18. The resiliency of the arms 12 and of the ring 14 is sufficiently pronounced to ensure that the detents 13 can yield by moving radially outwardly of the female component 2 and away from each other (arrows 29 in FIG. 3) when their cam faces 15 are engaged by the conical front flank 6 of the protuberance 5 while the front portion 11 of the component 1 is being forced into the front part of the component 2. The mutual spacing of the detents 13 in undeformed condition of the arms 12 and ring 14 is less than the diameter of the protuberance 5; this ensures that the shoulders 16 of the detents 13 invariably engage the flank 7 of the protuberance 5 when the insertion of the front portion 11 into the front part 12-14 is completed.

The disengaging member 3 has two substantially parallel walls 20 which are slidable in grooves or recesses 21 provided therefor in the internal surfaces of the arms 12 between the rear part 18 and the respective detents 13. The external surfaces 22 of the walls 20 have ramps 23 which serve to engage the bottom surfaces in the respective recesses 21 when the member 3 is moved to the (first) end position which is shown in FIG. 4. At such time, the ring 14 and the arms 12 are deformed in that the detents 13 are moved apart (arrows 29 in FIG. 3) so that the mutual spacing of the detents at least slightly exceeds the diameter of the protuberance 5 and the front portion 11 of the male component 1 can be readily extracted from the front part 12-14 of the female component 2. The member 3 is movable transversely (radially) of the female component 2 between the (operative or first) end position of FIG. 4 and a second end position or inoperative position (shown in FIG. 3) in which the ramps 23 are not in engagement with the bottom surfaces in the respective recesses 21 so that the arms 12 are free to maintain their detents 13 sufficiently close to each other to ensure that the radial flank 7 of the properly inserted protuberance 5 is engaged by the radial shoulders 16 of the detents. The slope of the ramps 23 is preferably such that the resilient arms 12 automatically move the ramps out of the respective recesses 21, i.e., that the member 3 is automatically urged toward the end position of FIG. 3. In other words, it is necessary to forcibly maintain the member 3 in the position of FIG. 4 if the front portion 11 of the male component 1 is to be extracted from the front part of the female component 2. To this end, the operator grasps the conduit around the rear part 18 with at least three fingers of one hand and uses the thumb of the one hand to press the member 3 in the direction of arrow 29 (FIG. 3) while the other hand holds the hose which surrounds the rear portion 8 of the male component 1. The application of force in the direction of arrow 28 causes the ramps 23 to penetrate into the respective recesses 21 whereby the detents 13 move apart (arrows 29 in FIG. 3) so that the other hand can readily extract the front portion 11 from the front part 12-15. At such time, the member 3 is maintained in the end position of FIG. 4.

The member 3 further comprises two webs 26, 27 which alternate with the walls 20. The web 26 abuts the protuberance 5 when the member 3 reaches the end position of FIG. 4 to thus ensure that the member 3 cannot be pushed beyond such end position, i.e., further away from the end position of FIG. 3. Those ends of the walls 20 which are remote from the respective ramps 23 are provided with tooth-shaped external stops 25 having shoulders 24 which engage the faces 30 of the respective arms 12 when the member 3 reaches the end position of FIG. 3. This ensures that the member 3 cannot be moved beyond such end position, i.e., further away from the end position of FIG. 4.

The dimensions of the ramps 23 are selected in such a way that the distance between the detents 13 in that end position of the member 3 which is shown in FIG. 4 suffices to ensure that the protuberance 5 can bypass the detents 13 on its way out of the front part 12-14 of the female component 2.

The resiliency of the arms 12 and of the ring 14 is sufficiently pronounced to permit a movement of the detents 13 away from each other, either as a result of movement of the conical front flank 6 of the protuberance 5 into the front part 12-14 of the female component 2 or in response to movement of the walls 20 from the end positions of FIG. 3 to the end positions of FIG. 4. On the other hand, the tendency of the arms 12 to reassume their undeformed states is also sufficiently pronounced to ensure that the bottom surfaces in the recesses 21 act upon the ramps 23 in a sense to automatically shift the member 3 to the end position of FIG. 3 as soon as the operator ceases to apply a force in the direction of arrow 28. This ensures that the components 1 and 2 are highly unlikely to be accidentally separated from each other once the front portion 11 has been properly inserted into the front part 12-14 and the person in charge has ceased to apply a deforming force in the direction of arrow 28.

The exposed edge face of the web 26 is serrated, toothed or corrugated in order to reduce the likelihood of slippage of the finger (e.g., thumb) which is used to press the member 3 in the direction of arrow 28. The external surface of the web 27 is a convex surface which facilitates introduction of the walls 20 into the space between the arms 12; at such time, the stops 25 initially expand the arms 12 but the arms thereupon snap toward each other to ensure that the walls 20 are properly received in the respective recesses 21.

The front portion 11 of the male component 1 can be introduced into the front part 12-14 of the female component 2 while the member 3 dwells in the end position of FIG. 3. This necessitates the application (to the component 1 and/or 2) of an axial force which suffices to ensure that the conical front flank 6 of the protuberance 5 can move the detents 13 apart before the detents rapidly move toward each other to ensure that their shoulders 16 engage the radial flank 7 of the fully inserted protuberance 5. Alternatively, insertion of the front portion 11 can be carried out with the exertion of minimal force if the member 3 is held in the end position of FIG. 4 during introduction of the male component 1 into the female component 2. The first mode of operating the improved connector is normally preferred because the operator can readily detect that the insertion of the front portion 11 into the front part 12-14 is completed, i.e., the operator can feel and/or hear that the detents 13 have snapped behind the radial flank 7 of the protuberance 5. The ring 14 temporarily assumes an oval shape during forcible insertion of the protuberance 5 between and beyond the detents 13, and the ring 14 reassumes its normal circular shape as soon as the insertion or extraction of the front portion 11 is completed.

All elements of the improved connector can be made of a suitable plastic material, and the rigidity of the male component 1 and disengaging member 3 can be more pronounced than that of the front part 12-14 of the female component 2. It is preferred to select the resiliency of the front part 12-14 and the rigidity of the member 3 in such a way that the member 3 cannot be separated from the female component 2 by pushing the web 27 counter to the direction of arrow 28 because the shoulders 24 of the stops 25 then engage the adjacent faces 30 of the respective arms 12 and prevent further depression of the web 27 toward the interior of the female component 2. Expulsion of the member 3 from the female component 2 in the direction of arrow 28 would be possible only after the male component 1 is extracted from the female component 2, and such expulsion preferably necessitates a rather pronounced force.

The slope of the ramps 23 is selected with a view to ensure that the detents 13 can be disengaged from the protuberance 5 preparatory to extraction of the front portion 11 from the female component 2 but such slope should not be too pronounced in order to avoid excessive deformation of and eventual damage to the arms 12 and ring 14 while the member 3 is being manipulated to move the detents 13 away from each other (i.e., in directions which are indicated by the arrows 29 of FIG. 3).

The male component 1 is or can be centered by the female component 2 preparatory to or even during extraction of the front portion 11; this ensures that the shoulder 7 is not intercepted by one of the detents 13 and/or by the (then oval) ring 14 during movement of the protuberance 5 away from the rear part 18 of the female component 2.

The disengaging member 3 can be made of a plastic material which exhibits a certain amount of elasticity to thus facilitate insertion of this member between the arms 12. However, it is equally within the purview of the invention to make at least the male component 1 and the disengaging member 3 of a metallic material. At the present time, the elements 1, 2, 3 and 4 of the improved connector are preferably mass-produced from plastic material.

Those portions of external surfaces 22 of the walls 20 which are adjacent the ramps 23 are parallel to each other and the distance of such surfaces from each other equals or is only slightly less than the distance of the bottom surfaces in the recess 21 from one another.

An important advantage of the improved connector is that the web 26 centers the male component 1 during extraction of the protuberance 5 from the front part 12-14 of the female component 2. This greatly reduces the likelihood that the radial flange 7 of the protuberance 5 would become caught by one of the detents 13 and/or by the ring 14 during extraction of the protuberance from the female component 2.

Another important advantage of the improved connector is that the ramps 23 of the member 3 can be readily designed and dimensioned in such a way that the ring 14 and/or the arms 12 are highly unlikely to undergo excessive deformation preparatory to extraction of the front portion 11 from the front part 12-14.

The stops 25 and their shoulders 24 constitute an optional but desirable and advantageous feature of the disengaging member 3. These stops ensure that the person in charge of assembling the member 3 with the female component 2 senses when the insertion of the member 3 is completed, i.e., when the member 3 has been advanced in the direction of arrow 28 to such an extent that the surfaces 22 of the walls 20 are free to snap into the respective recesses 21. The surfaces bounding the recesses 21 confine the member 3 to movements between its two end positions, i.e., the member 3 is not likely to change its orientation relative to the arms 12 and ring 14. Moreover, the surfaces bounding the recesses 21 guide the member 3 during assembly with the female component 2, i.e., during advancement of the stops 25 in and beyond the respective recesses.

FIG. 5 shows a portion of a quick-release connector which employs a modified disengaging member 3'. The main difference between the members 3 and 3' is that the ramps 23' of the walls 20 on the member 3' are somewhat shorter and steeper and are adjacent to platforms 31 having parallel external surfaces which engage the bottom surfaces in the respective recesses 21 when the member 3' moves to the (first) end position of FIG. 5. The platforms 31 then cooperate with the arms 12 to maintain the detents 13 (not shown in FIG. 5) in spaced apart positions so that the front portion 11 of the male component 1 can be repeatedly inserted into or withdrawn from the front part 12-14 of the female component 2 without the need for a change of positions of the walls 20. Thus, it is necessary to forcibly move the member 3' to the end position of FIG. 5 as well as to move the member 3' from such end position, at least until the platforms 31 are moved upwardly (as viewed in FIG. 5) and beyond the respective recesses 21 so that the bottom surfaces in such recesses can act upon the relatively short and steep ramps 23' in order to automatically move the member 3' toward the other end position. Alternatively, the configuration of the walls 20 in the member 3' of FIG. 5 can be such that it is necessary to apply finger pressure in order to move the member 3' to the end position of FIG. 5 as well from such end position and all the way to the other end position corresponding to the position of the member 3 which is shown in FIG. 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A quick-release connector for a pair of conduits, comprising a tubular male component having a rear portion connectable with one of the conduits, a front portion and a protuberance between said portions, said protuberance having a conical front flank sloping inwardly toward said front portion and a substantially radial flank confronting said rear portion; an elongated tubular female component having a rear part connectable with the other of the conduits and a resilient front part arranged to receive the front portion of said male component, said front part comprising a ring and a pair of arms disposed substantially diametrically opposite each other and extending longitudinally of said female component between said ring and said rear part, said front part further comprising an internal male detent for each of said arms, each of said detents being aligned with the respective arm and having a conical cam face sloping outwardly away from said rear part, said male detents being displaceable by said conical flank during insertion of said front portion into said front part and each detent further having a substantially radial shoulder confronting said rear part and abutting said radial flank upon completed insertion of said front portion; and means being irremovably attached to said front part at least upon said completed insertion for disengaging said detents from said protuberance to permit extraction of said front portion from said front part, said disengaging means having two spaced apart walls each of which is inwardly adjacent one of said arms and each of which is movable transversely of said front part between first and second positions, said walls having ramps which engage and spread said arms apart in response to movement of said walls toward said first positions to thereby disengage said detents from said protuberance, said ramps permitting said arms to move their detents toward each other due to resiliency of said front part in the second positions of said walls.

2. The connector of claim 1, wherein at least one of said walls has a stop which abuts the respective arm in the second positions of said walls.

3. The connector of claim 1, wherein said disengaging means is an annular member which further comprises two webs alternating with said walls, one of said webs abutting said protuberance in said first positions of said walls.

4. The connector of claim 1, wherein said ring has an inner diameter and said protuberance has an outer diameter smaller than said inner diameter, said detents being spaced apart from each other a distance which is less than said outer diameter when said front portion is extracted from said front part.

5. The connector of claim 1, further comprising at least one elastically deformable annular sealing element arranged to surround said front portion within said front part in inserted position of said front portion.

6. The connector of claim 1, wherein said arms have internal surfaces adjacent the respective detents and transversely extending recesses provided in said internal surfaces for the respective walls.

7. The connector of claim 1, wherein said arms abut the respective ramps in said first positions of said walls.

8. The connector of claim 7, wherein said ramps have a slope such that said arms automatically maintain said walls in said second positions due to resiliency of said front part unless said walls are forcibly held in said first positions.

9. The connector of claim 1, wherein said walls further comprise platforms adjacent the respective ramps and engaging the respective arms in the first positions of said walls to prevent said arms from moving said walls toward said second positions due to resiliency of said front part.

10. The connector of claim 9, wherein said platforms have parallel outer surfaces which engage the respective arms in the first positions of said walls.

* * * * *